United States Patent [19]
Tsukimoto et al.

[11] Patent Number: 5,274,295
[45] Date of Patent: Dec. 28, 1993

[54] VIBRATION DRIVEN MOTOR

[75] Inventors: Takayuki Tsukimoto, Kawasaki; Takashi Maeno, Yokohama, both of Japan

[73] Assignee: Canon Kabushiki Kaisha, Tokyo, Japan

[21] Appl. No.: 994,177

[22] Filed: Dec. 18, 1992

Related U.S. Application Data

[63] Continuation of Ser. No. 751,791, Aug. 29, 1991, abandoned.

[30] Foreign Application Priority Data

Aug. 31, 1990 [JP] Japan ................. 2-230262

[51] Int. Cl.$^5$ .............................................. H01L 41/08
[52] U.S. Cl. ..................................... 310/323; 310/325
[58] Field of Search ...................... 310/323, 328, 325

[56] References Cited

U.S. PATENT DOCUMENTS

| | | | |
|---|---|---|---|
| Re. 33,390 | 10/1990 | Sashida | 310/328 |
| 4,210,837 | 7/1980 | Vasiliev et al. | 310/323 |
| 4,548,090 | 10/1985 | Sashida | 310/323 X |
| 4,663,556 | 5/1987 | Kumada | 310/323 X |
| 4,692,650 | 9/1987 | Okumura et al. | 310/323 |
| 4,728,843 | 3/1988 | Mishiro | 310/325 |
| 4,884,002 | 11/1989 | Eusemann et al. | 310/323 |
| 5,028,833 | 7/1991 | Kawi | 310/323 |

FOREIGN PATENT DOCUMENTS

| | | |
|---|---|---|
| 0301429 | 2/1989 | European Pat. Off. |
| 0401762 | 12/1990 | European Pat. Off. |
| 0406843 | 1/1991 | European Pat. Off. |
| 0458638 | 11/1991 | European Pat. Off. |
| 0055584 | 2/1990 | Japan |
| 0794685 | 1/1981 | U.S.S.R. ............... 310/323 |
| 1070628 | 1/1984 | U.S.S.R. ............... 310/323 |

*Primary Examiner*—Mark O. Budd
*Attorney, Agent, or Firm*—Fitzpatrick, Cella, Harper & Scinto

[57] ABSTRACT

The contact portion of a movable member is endowed with a spring property to thereby effect uniform contact over the entire circumference of the movable member, thereby realizing an ultrasonic motor which is good in efficiency and suffers little from the occurrence of sounds.

13 Claims, 12 Drawing Sheets

FIG. 5A PRIOR ART
FIG. 5B PRIOR ART
FIG. 5C PRIOR ART
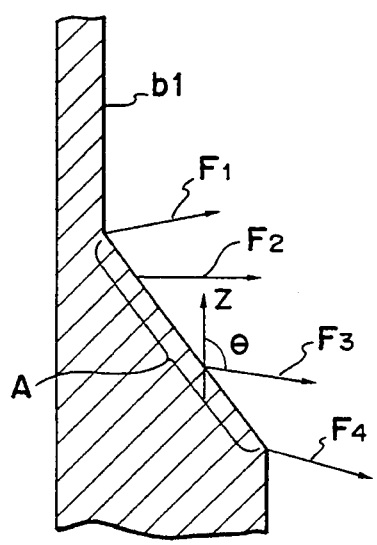

F I G. 10
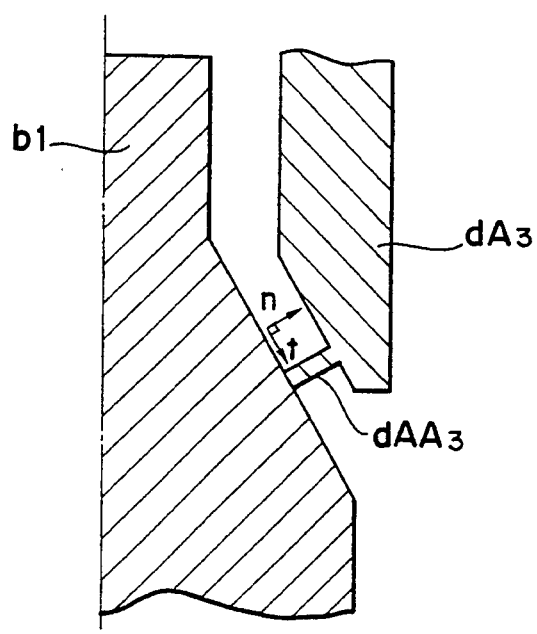

F I G. 15
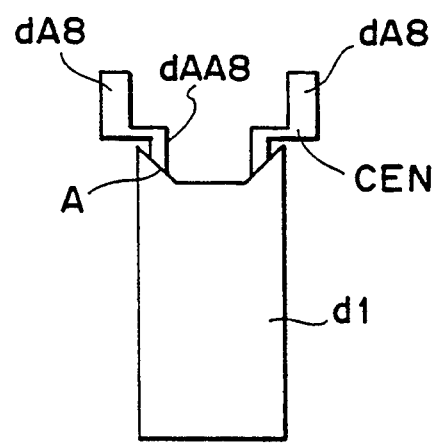

VIBRATION DRIVEN MOTOR

This application is a continuation of application Ser. No. 07/751,791 filed Aug. 29, 1991 now abandoned.

BACKGROUND OF THE INVENTION

1. Field of the Invention

This invention relates to an ultrasonic motor in which electrical energy is supplied to an electro-mechanical energy conversion element provided on a bar-like resilient member to thereby vibrate the resilient member as a bar-like vibration member and cause circular or elliptical motion in the surface particles of the vibration member, thus frictionally driving a movable member pressed against the vibration member, and particularly to an ultrasonic motor suitable for an optical instrument such as a camera or a business machine such as a printer.

2. Related Background Art

An ultrasonic motor of the type in which a flexural vibration is caused in a circular ring-like resilient member and a lens driving movable member is driven by a frictional force has heretofore been put into practice in an AF mechanism for a camera or the like. However, the motor of this conventional type is of a ring-like shape and therefore is relatively high in cost as a unit including a pressing mechanism, and is disadvantageous in cost as a motor which is not required to be hollow. So, a motor as the type as shown in FIGS. 2 and 3 of the accompanying drawings which is of the solid type and in which the construction of a pressing system or the like is easy has been proposed in recent years.

This proposed motor will now be briefly described with reference to FIGS. 2 to 4 of the accompanying drawings.

FIG. 2 is a pictorial view of a bar-like ultrasonic motor, FIG. 3 is a cross-sectional view of the central portion of the motor shown in Figure 2, and FIG. 4 is a schematic view showing the vibrating of the vibration member of the motor shown in FIG. 2. The $\gamma$ direction in FIG. 4 refers to a direction along the $\gamma$ axis perpendicular to the Z direction shown in FIG. 2 (a direction along the axis of vibration members b1 and b2, i.e., the Z axis), and the $\gamma$-Z plane refers to a plane formed by the $\gamma$ axis and the Z axis. The bar-like ultrasonic motor as shown in FIG. 2 has two hollow disk-like piezoelectric elements (for example, PZT) a1 and a2 interposed between a metallic hollow upper vibration member b1 and a metallic hollow lower vibration member b2, threaded portions bb1 and bb2 provided on the inner periphery sides of the upper vibration member b1 and the lower vibration member b2, respectively, and a bolt c threadably engaged with said threaded portions with the two piezoelectric elements a1 and a2 held therebetween.

When AC signals which are electrically out of phase with each other (usually signals which are 90° out of phase with each other) are applied from a conventional driving circuit, not shown, to the piezoelectric elements a1 and a2, for example, vibrations which are 90° out of phase with each other in position and in time are excited in the vibration members b1 and b2 because the piezoelectric elements a1 and a2 as electro-mechanical energy conversion elements are out of phase with each other in polarized position, and the surface particles of the vibration members make rotational movement as viewed from the direction of the Z axis.

The letter d designates a hollow rotor having a projection dd and a contact portion AA which are in contact with the vibration member b1, and the letter f denotes a pressing member for bringing the rotor d into frictional engagement with the vibration member b1 by a spring e through a bearing g.

In such a motor, no contrivance has been made in the portion of contact A between the vibration members b1, b2 and the rotor d and therefore, it has been impossible for the rotor d to always keep contact with the vibration member b1 over the entire circumference of the vibration member in which the displacement of vibration is several microns.

Accordingly, it has been impossible to take out the motor output sufficiently and the efficiency of the motor has been bad.

Also, the failure in making smooth contact has given birth to harsh sounds.

Further, there has arisen a problem which will hereinafter be described. Careful observation of the portion of contact A between the vibration member b1 and the rotor d as a movable member during the vibration of the vibration member b1 shows that depending on the ratio between the vibration components in the $\gamma$ direction and the Z direction, the vibration member b1 has an angle of vibration.

This angle of vibration is defined as an angle $\theta$ formed with respect to the Z axis, as shown in FIG. 5A of the accompanying drawings.

On the other hand, the direction in which the movable member d is deformed by being subjected to the vibration from the vibration member b1 is determined by the shape of the movable member d, and in the movable member d shown in FIG. 6 of the accompanying drawings, it is the direction of an angle $\phi$. Here, the arrow F$\phi$ indicates the direction of deformation of the movable member d, and Z indicates the aforementioned Z axis.

At this time, as shown in FIG. 7 of the accompanying drawings, the contact portion AA on the movable member d side slides by $\Delta l$ (see FIG. 7), and if at this time, sliding takes place, an energy loss will be caused and a reduction in efficiency will be caused.

In FIG. 5A, F1-F4 indicate the directions of vibration at various points on the portion of contact A on the vibration member b1, and the characteristics of FIGS. 5B and 5C show the vibration amplitude of the vibration member b1 in the $\gamma$ axis direction and the vibration amplitude of the vibration member b1 in the Z axis direction, respectively, during vibration.

SUMMARY OF THE INVENTION

It is an object of the present invention to provide an ultrasonic motor (hereinafter referred to also as a vibration driven motor) which is good in efficiency and free from occurrence of sounds.

It is another object of the present invention to provide an ultrasonic motor which is free from any reduction in efficiency based on the sliding of the portion of contact on the movable member side.

Other objects of the present invention will become apparent from the following detailed description of the invention.

One aspect of the present invention is to endow the contact portion on the movable member side with a spring property to thereby effect uniform contact over the entire circumference of the movable member, thereby realizing an ultrasonic motor which is good in efficiency and suffers little from the occurrence of sounds.

Another aspect of the present invention is to make the direction of displacement of the vibration member and the direction of resultant deformation of the contact portion of the movable member substantially coincident with each other, thereby realizing an ultrasonic motor which is free from energy loss caused by an unnecessary frictional force.

BRIEF DESCRIPTION OF THE DRAWINGS

FIGS. 5A, 5B and 5C illustrate the states of vibration of a vibration member in the motor shown in FIG. 2.

FIGS. 8A, 8B, 9A, 9B and 10 to 15 are schematic views of the essential portions of ultrasonic motors according to other embodiments of the present invention.

DESCRIPTION OF THE PREFERRED EMBODIMENTS

Figure 1:
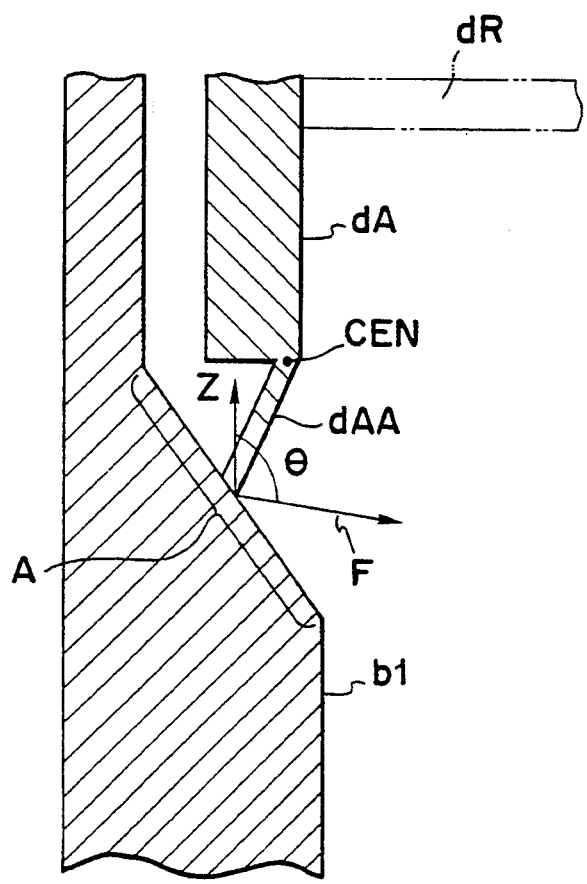
FIG. 1 is a cross-sectional view of the essential portions of a bar-like ultrasonic motor to which the present invention is applied.

FIG. 1 is a cross-sectional view of the essential portions of an embodiment of an ultrasonic motor to which the present invention is applied.

Figure 3:
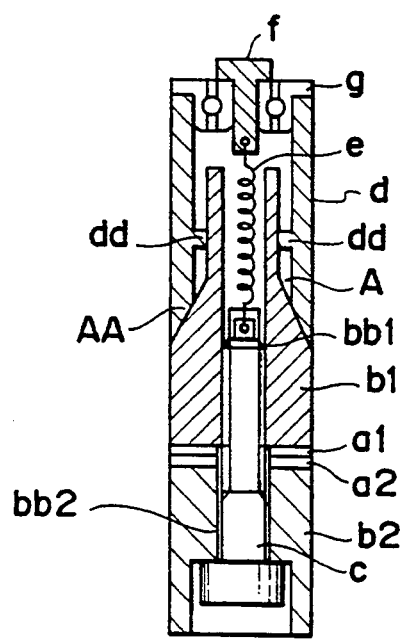
FIG. 3 is a cross-sectional view of the motor shown in FIG. 2.
Figure 4:
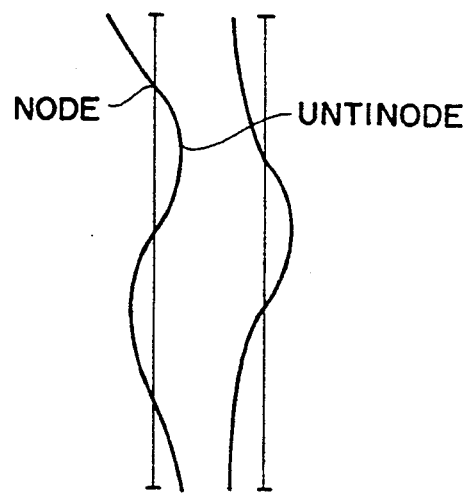
FIG. 4 illustrates the states of vibrations in various directions in the motor shown in FIG. 2.
Figure 6:
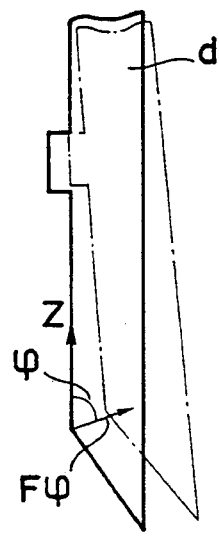
FIGS. 6 and 7 illustrate the direction of displacement of the movable member of the motor shown in FIG. 2.
Figure 7:
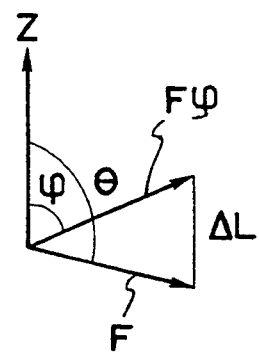

In FIG. 1, the reference character b1 designates a hollow upper vibration member of substantially the same shape as the vibration member in the motor shown in FIG. 3. The hollow upper vibration member b1 is formed of a metallic resilient material and has a tapered contact portion A in the intermediate portion thereof. Denoted by dA is a rotor as a movable member of substantially the same shape as the movable member d in the motor shown in FIG. 3. The rotor dA differs from the movable member b in that the contact portion dAA on the movable member side which contacts with the contact portion A on the vibration member side and receives a drive force from said contact portion A has a flange-like portion having a spring property. This rotor dA is engaged with the lens driving mechanism dR of a camera and forms a drive source for said driving mechanism. The contact portion dAA on the movable member side is deformed with CEN as the center of deformation. Also, this contact portion dAA is flexible with respect only to the direction of vibration (the direction of displacement) F of the area of the contact portion A of the vibration member b1, or a direction substantially coincident therewith, and has a hard characteristic in the other directions, i.e., the circumferential direction of the vibration member b1 and a direction parallel to a plane perpendicular to the direction of displacement of the vibration member b1 and passing through the axis of the vibration member. Since the direction of deformation of the flange-like contact portion dAA of the movable member dA and the direction of displacement of the vibration member b1 are coincident or substantially coincident with each other, there is provided an ultrasonic motor in which the aforementioned excess sliding loss does not occur and which is good in efficiency.

Figure 2:
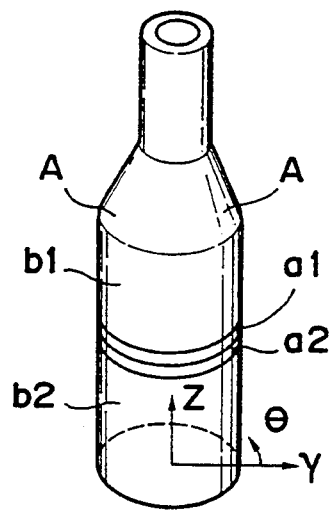
FIG. 2 is a pictorial view of a bar-like ultrasonic motor according to the prior art.

Also, since the contact portion dAA has a hard characteristic in the other directions, there is provided a motor which is good in responsiveness. Further, since the contact portion dAA has a spring property, the movable member dA uniformly and smoothly contacts with the vibration member b1 over the entire circumference thereof and thus, an improvement in efficiency is achieved and the creation of harsh sounds can be prevented. The other elements of the ultrasonic motor shown in FIG. 1 are the same as those of the motor shown in FIGS. 2 and 3 and therefore need not be described.

Other embodiments of the present invention shown in FIGS. 8 to 15 are substantially similar to the embodiment shown in FIG. 1 and therefore, only the differences therebetween will be described in detail and the other portions need not be described.

Figure 8A:
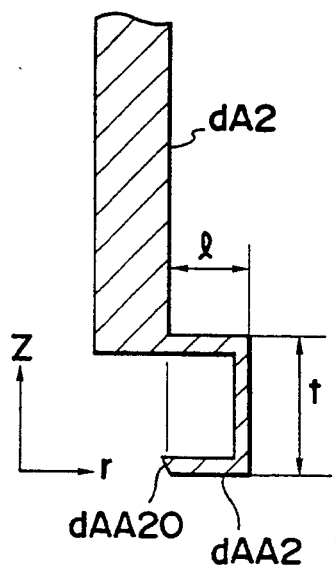
Figure 8B:
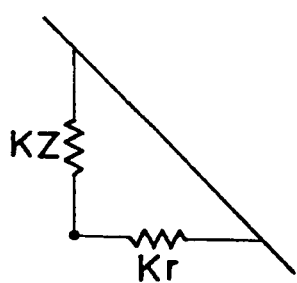

In the second embodiment shown in FIGS. 8A and 8B, a movable member dA2 formed as a rotor has a U-shaped flange-like contact portion of spring property in the portion thereof which contacts with the contact portion A of the vibration member b1. This flange-like contact portion dAA2 is a spring having thinwalled structure in the direction of the $\gamma$ axis and the direction of the Z axis, and by changing the length of each side thereof, it is possible to change spring constants Kr and KZ in FIG. 8B schematically showing the characteristic of the flange-like contact portion dAA2. Accordingly, by this change, the direction of deformation of the flange-like contact portion dAA2 can be appropriately set so that efficiency is maximized.

Incidentally, when $KZ=Kr$ is set, the flange-like contact portion is deformed always in the direction F of a force applied from the contact portion A of the vibration member. Kr and KZ represent the spring constants in the direction of the $\gamma$ axis and the direction of the Z axis, respectively, and dAA20 designates a portion which contacts with the contact portion A of the vibration member b1 and receives a drive force therefrom.

Figures 9A, 9B:
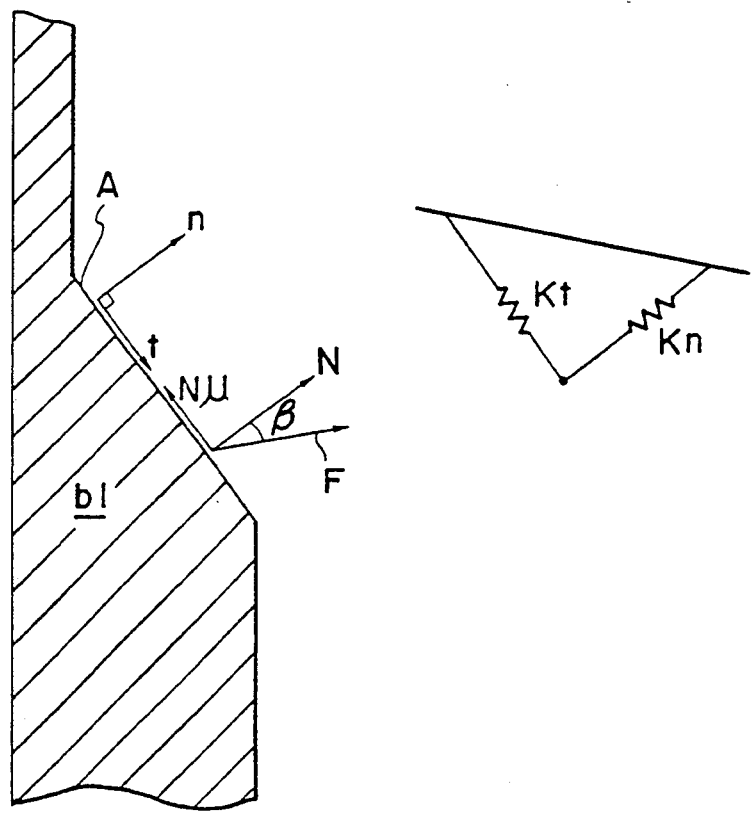

The condition under which the direction of deformation of the movable member dA2 coincides with the direction of displacement (the direction of vibration) of the vibration member b1 will now be described with reference to FIGS. 9A and 9B. When the direction perpendicular to the tapered contact portion A of the vibration member b1 is defined as the n axis (see FIG. 9A) and the horizontal direction is defined as the t axis and the hardnesses of the flange-like contact portion dAA20 shown in FIG. 8A in the directions of the n axis and t axis (see FIG. 9A) are kn and kt (see FIG. 9B) and the amount of displacement of the vibration member b1 is F and the angle formed by the vibration member with respect to the n axis is $\beta$, the component of the displacement of the vibration member b1 in the t direction is $F\sin\beta$. Therefore, with respect to the force in the direction of the t axis, when $F\sin\beta Kt < N\mu$ (N being the vertical drag and $N=F\cos\mu Kn$, and $\mu$ being the coefficient of static friction), the flange-like contact portion dAA20 of the movable member which contacts with the contact portion A of the vibration member causes no sliding in the direction of the t axis and no sliding loss occurs. Where, for example, the movable member is of such structure as shown in FIG. 10, wherein it has a contact portion dAA3 perpendicular to the t axis, it becomes a spring structure soft in the direction of the t axis (see FIG. 10) and therefore, any excess sliding is not apt to occur.

Embodiments in which an effect similar to that described above is realized by the use of an elastic member formed of resin, rubber or the like will be described below.

Figure 11:
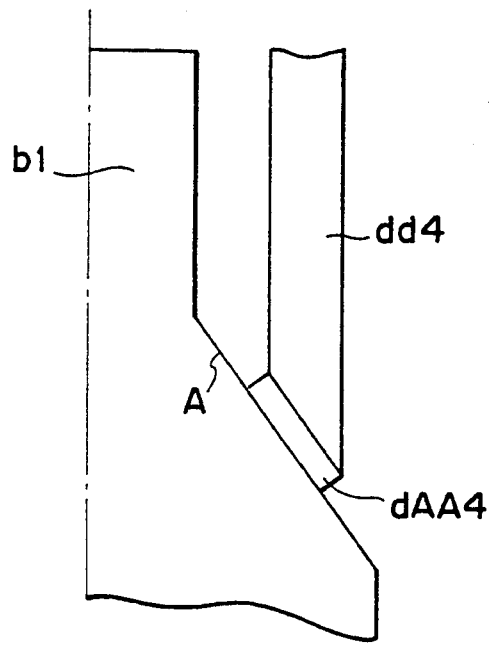

FIG. 11 shows an embodiment in which the contact portion dAA4 of a rotor dA4 which frictionally contacts with the contact portion A of a vibration member b1 similar to that in the first embodiment is formed of rubber or a resinous soft material.

Figure 12:
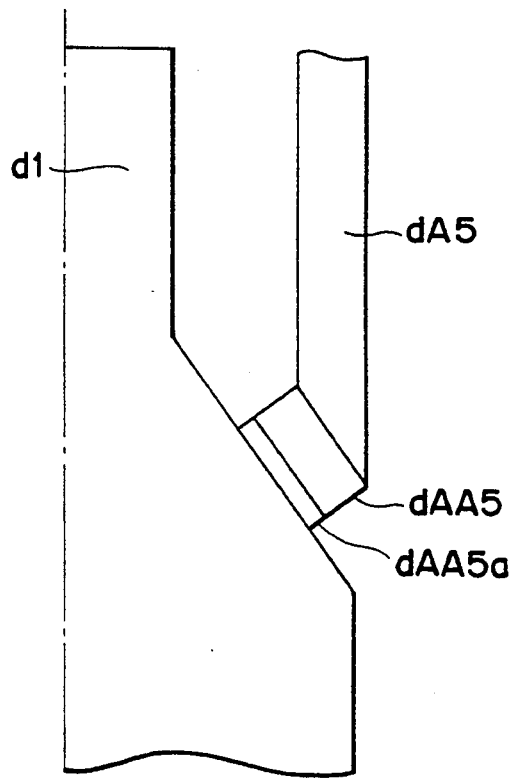

FIG. 12 shows an embodiment in which to increase the wear resistance of a rotor dA5, a contact portion dAA5a formed of a wear-resisting material such as a ceramic is further secured to the tip end of an intermediate portion dAA5 formed of a material similar to that of the aforedescribed contact portion dAA4 shown in FIG. 11.

Figure 13:
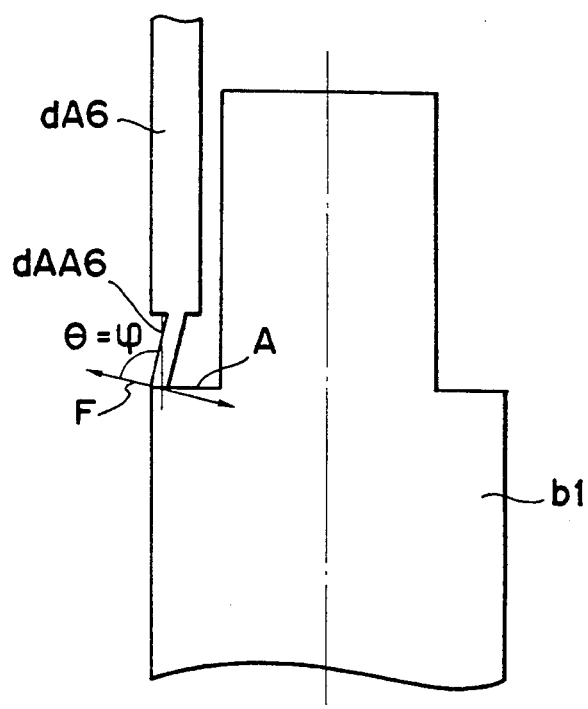
Figure 14:
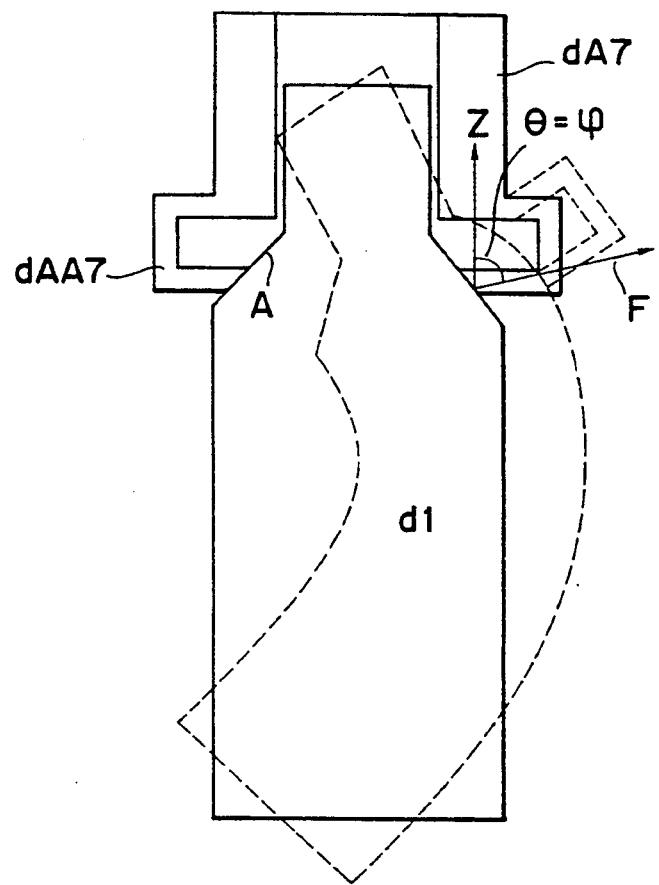

FIGS. 13, 14 and 15 show embodiments in which $\theta = \phi$, that is, the direction of deformation of the contact portion A of the vibration member is made coincident or substantially coincident with the direction of deformation of the flange-like contact portion dAA6, dAA7 and dAA8 of movable members dA6, dA7 and dA8, respectively.

The present invention can provide an ultrasonic motor which is good in efficiency and suffers little from the occurrence of sounds because the contact portion on the movable member side is endowed with a spring property so that the contact portion of the movable member may uniformly contact with the vibration member over the entire circumference thereof.

Also, if as in the embodiments, the direction of displacement of the contact portion of the vibration member is made coincident or substantially coincident with the direction of deformation of the contact portion of the movable member which contacts with said contact portion of the vibration member, there can be provided an ultrasonic motor which is free from any energy loss caused by an unnecessary frictional force.

What is claimed is:

1. A vibration driven motor comprising:
   a vibration member having a contact surface, said member generating therein at least two vibrations in different planes and having a phase difference in time therebetween in response to an applied electrical signal; and
   a contact member having a contact portion provided in contact with the contact surface of said vibration member and for receiving a combined vibration of said two vibrations as a driving force from said vibration member, said contact portion having a spring characteristic which satisfies a relation:

$$F \sin\beta \, Kt < N \mu$$

where,
   F is an amount of vibration deviation of the vibration member at the contact portion of the contact member and said contact surface;
   N is a vertical drag;
   $\mu$ is a fraction coefficient;
   $\beta$ is an angle formed by a direction perpendicular to the contact surface and the vibration deviation; and
   Kt is a hardness in a direction parallel to the contact surface.

2. A vibration driven motor according to claim 1, wherein the contact surface of said vibration member includes a tapered portion.

3. A vibration driven motor according to claim 2, wherein said contact portion is of a shape which makes surface contact with the tapered portion of said contact surface.

4. A vibration driven motor according to claim 1, wherein said contact portion has a U-shaped portion.

5. A vibration driven actuator comprising:
   a vibration member having a contact surface, said member generating therein at least two vibrations in different planes and having a phase difference in time therebetween in response to an applied electrical signal; and
   a contact member having a contact portion provided in contact with the contact surface of said vibration member and for receiving a combined vibration of said two vibrations as a driving force from said vibration member, said contact portion having a spring characteristic which satisfies a relation:

$$F \sin\beta Kt < N\mu$$

where,
   F is an amount of vibration deviation of the vibration member at the contact portion of the contact member and said contact surface;
   N is a vertical drag;
   $\mu$ is a friction coefficient;
   $\mu$ is an angle formed by a direction perpendicular to the contact surface and the vibration deviation; and
   Kt is a hardness in a direction parallel to the contact surface.

6. A vibration driven actuator according to claim 5, wherein the contact surface of said vibration member includes a tapered portion.

7. A vibration driven actuator according to claim 6, wherein said contact portion is of a shape which makes surface contact with the tapered portion of said contact surface.

8. A contact device for a motor having a vibration member having a contact surface and for generating at least two vibrations in different planes and having a phase difference in time therebetween in response to an applied electrical signal, said device comprising:
   a contact member having a contact portion provided in contact with the contact surface of said vibration member and for receiving a combined vibration of said two vibrations as a driving force from said vibration member, said contact portion having a spring characteristic which satisfies a relation:

$$F \sin\beta Kt < N \mu$$

where,
   F is an amount of vibration deviation of the vibration member at the contact portion of the contact member and said contact surface;
   N is a vertical drag;
   $\mu$ is a friction coefficient;
   $\beta$ is an angle formed by a direction perpendicular to the contact surface and the vibration deviation; and
   Kt is a hardness in a direction parallel to the contact surface.

9. A vibration driven system comprising:
   a vibration member having a contact surface, said member generating therein at least two vibrations in different planes and having a phase difference in time therebetween in response to an applied electrical signal;
   a contact member having a contact portion provided in contact with the contact surface of said vibration member and for receiving a combined vibration of said two vibrations as a driving force from said vibration member, said contact portion having a spring characteristic which satisfies a relation:

$$F \sin\beta Kt < N\mu$$

where

F is an amount of vibration deviation of the vibration member at the contact portion of the contact member and said contact surface;
N is a vertical drag;
$\mu$ is a friction coefficient;
$\beta$ is an angle formed by a direction perpendicular to the contact surface and the vibration deviation; and
Kt is a hardness in a direction parallel to the contact surface; and
a driving mechanism driven by said contact member.

10. A vibration driven motor, comprising:
a vibration member having a contact surface, said member generating therein at least two vibrations having a phase difference in time therebetween in response to an applied electrical signal; and
a contact member having a contact portion provided in contact with the contact surface of said vibration member and for receiving a combined vibration of said two vibrations as a driving force from said vibration member, said contact portion having a spring characteristic which satisfies a relation;

$$F\sin\beta Kt < N\mu$$

where,
F is an amount of vibration deviation of the vibration member at the contact portion of the contact member and said contact surface;
N is a vertical drag;
$\mu$ is a friction coefficient; $\beta$ is an angle formed by a direction perpendicular to the contact surface and the vibration deviation; and
Kt is a hardness in a direction parallel to the contact surface.

11. A vibration driven actuator comprising:
a vibration member having a contact surface, said member generating therein a vibration in response to an applied electrical signal; and
a contact member having a contact portion provided in contact with the contact surface of said vibration member and for receiving the vibration as a driving force from said vibration member, said contact portion having a spring characteristic which satisfies a relation:

$$F\sin\beta Kt < N\mu$$

where,
F is an amount of vibration deviation of the vibration member at the contact portion of the contact member and said contact surface;
N is a vertical drag;
$\mu$ is a friction coefficient;
$\beta$ is an angle formed by a direction perpendicular to the contact surface and the vibration deviation; and
Kt is a hardness in a direction parallel to the contact surface.

12. A contact device for a motor having a vibration member having a contact surface and for generating at least two vibrations in response to an applied electrical signal, said device comprising:
a contact member having a contact portion provided in contact with the contact surface of said vibration member and for receiving a combined vibration of said two vibrations as a driving force from said vibration member, said contact portion having a spring characteristic which satisfies a relation:

$$F\sin\mu Kt < N\mu$$

where,
F is an amount of vibration deviation of the vibration member at the contact portion of the contact member and said contact surface;
N is a vertical drag;
$\mu$ is a friction coefficient;
$\beta$ is an angle formed by a direction perpendicular to the contact surface and the vibration deviation; and
Kt is a hardness in a direction parallel to the contact surface.

13. A vibration driven system comprising:
a vibration member having a contact surface, said member generating therein at least two vibrations in response to an applied electrical signal;
a contact member having a contact portion provided in contact with the contact surface of said vibration member and for receiving a combined vibration of said two vibrations as a driving force from said vibration member, said contact portion having a spring characteristic which satisfies a relation:

$$F\sin\beta Kt < N\mu$$

where, F is an amount of vibration deviation of the vibration member at the contact portion of the contact member and said contact surface; N is a vertical drag; $\mu$ is a driction coefficient; $\beta$ is an angle formed by a direction perpendicular to the contact surface and the vibration deviation; and Kt is a hardness in a direction parallel to the contact surface;
and a driving mechanism driven by said contact member.

* * * * *

UNITED STATES PATENT AND TRADEMARK OFFICE
CERTIFICATE OF CORRECTION

PATENT NO. : 5,274,295
DATED : December 28, 1993
INVENTOR(S) : TAKAYUKI TSUKIMOTO, ET AL.

It is certified that error appears in the above-indentified patent and that said Letters Patent is hereby corrected as shown below:

COLUMN 6
line 26, "$\mu$ should read --B--.

COLUMN 7
line 38, "B" should read --¶ B--.

COLUMN 8
line 22, "Fsin $\mu$ Kt<N$\mu$" should read --Fsin B Kt <N$\mu$--; and
line 49, "driction" should read --friction--.

COLUMN 1
line 5, "Aug. 29, 1991" should --Aug. 29, 1991,---.

COLUMN 4
line 21, "thinwalled" should read --thin-walled--.

Signed and Sealed this

Twenty-eighth Day of June, 1994

Attest:

BRUCE LEHMAN

Attesting Officer     *Commissioner of Patents and Trademarks*